April 11, 1961 M. GARBUNY 2,979,622

THERMAL IMAGE CONVERTER

Filed Oct. 29, 1956

INVENTOR.
MAX GARBUNY
BY Wade Koontz
ATTORNEY and
James S. Shannon
AGENT

United States Patent Office 2,979,622

Patented Apr. 11, 1961

2,979,622

THERMAL IMAGE CONVERTER

Max Garbuny, Pittsburgh, Pa., assignor, by mesne assignments, to the United States of America as represented by the Secretary of the Air Force Filed Oct. 29, 1956, Ser. No. 619,093

3 Claims. (Cl. 250—217)

This invention relates to image converters of the type utilizing the principal of temperature variation of photoemission. Image converters of this type have a photoemissive surface composed of a material the photoemissivity of which varies with temperature, and means for forming an image thereon of a source or sources of radiation in the infrared region. As a result the temperature over the photoemissive surface and its photoemissivity vary in accordance with the incident energy distribution in the infrared image. When the photoemissive surface is scanned by a spot of light, the resulting photoemissive current varies in accordance with the infrared image.

Certain factors in the image converter may also have an influence on the photoemissive current and the resulting spurious signal, competing with the image signal, lowers, in effect, the signal to noise ratio of the converter. My application Serial No. 619,094 filed October 29, 1956 describes and claims methods of reducing the spurious signal due to nonuniforimities in the photoemissive surface. Another source of undesired variations in the photoemissive current is nonuniformity in the intensity of the scanning spot of light. Where the scanning spot is derived from the fluorescent screen of a cathode-ray tube, variations in the intensity of the scanning spot may result from nonuniformities in the phosphor. It is the object of this invention to reduce the effect of such variations in the output signal of the converter. Briefly, this is accomplished by generating a voltage proportional to the intensity of the scanning spot and utilizing this voltage either for combination with the output signal to cancel the undesired variations or as a negative feedback to the beam intensity control electrode of the cathode-ray tube to maintain a constant spot intensity.

Figure 1:
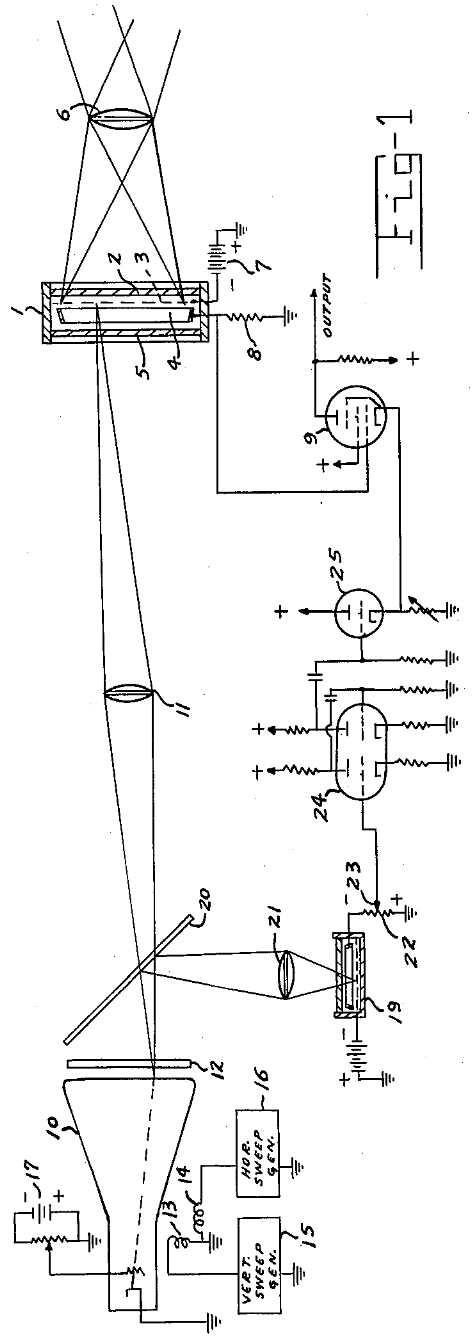
Figure 1A:
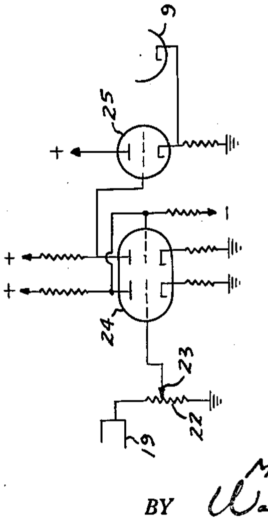

A more detailed description of the invention will be given in connection with the specific embodiments thereof shown in the accompanying drawings, in which Figure 1 is an image converter in accordance with the invention employing the cancellation technique;

Figure 1*a* is a modification of Figure 1; and

Figure 2:
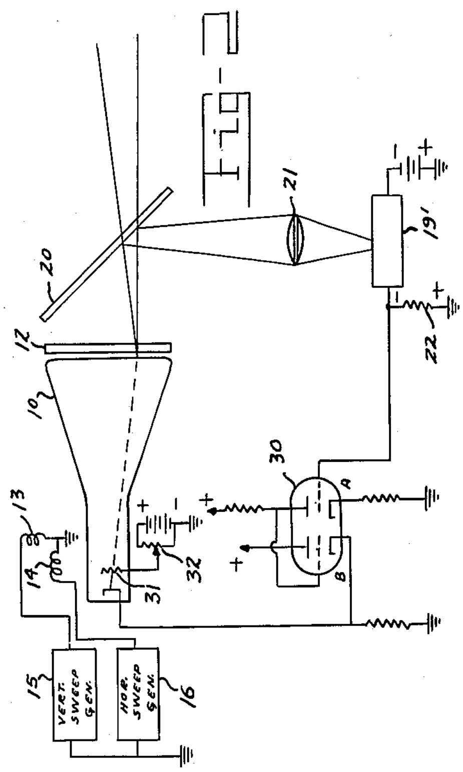

Figure 2 is an embodiment of the invention wherein the intensity of the scanning spot is held constant.

Referring to Figure 1, the evacuated cell 1 has an infrared transmitting window 2, of silver chloride for example, a semipermeable thermally sensitive photoemissive cathode 3, a collector electrode 4 and a glass window 5. When an infrared image is formed on the right hand surface of cathode 3, as by lens 6, and the left hand surface is scanned by a spot of light of wave length greater than the threshold wave length of the cathode material, which is the wave length below which the thermal sensitivity does not occur, photoelectrons are emitted from the left surface in numbers directly related to the temperature of that area of the cathode beneath the scanning spot. These electrons are collected by electrode 4, which is maintained at a positive potential relative to the cathode by voltage source 7, and the resulting current in resistor 8 varies as the cathode is scanned in accordance with the temperature distribution over the cathode surface. The resulting video output signal appearing across resistor 8 is applied to the control grid of preamplifier tube 9.

The scanning spot of light is derived from the fluorescent screen of cathode-ray tube 10 an image of which screen is formed on cathode 3 by lens 11. The cathode 3 may be of the cesium-antimony type which has a positive temperature coefficient with respect to red light and, in conformity with this, a red filter 12 is placed over the cathode-ray tube screen. The beam of tube 10 line scans the screen of the tube under the influence of vertical and horizontal deflection coils 13 and 14 which are energized from vertical and horizontal sweep generators 15 and 16. Since the screen of tube 10 is imaged on cathode 3 a similar scan of the cathode surface is carried out by the image of the spot of light formed by the beam on the screen of tube 10. The intensity of this spot may be controlled by means of voltage source 17 and potentiometer 18 which adjusts the potential of the beam intensity control grid relative to the cathode of tube 10.

The intensity of the scanning spot is sampled by forming a second image of the spot on photocell 19 through the use of partially reflecting mirror 20 and lens 21. The output current of the photocell and the voltage across resistor 22 are proportioned to the intensity of the scanning spot. It is preferable that the photocathode of cell 19 be made of the same material as cathode 3 in order that it respond similarly to changes in light intensity. Cell 19, therefore, is shown to be of the same general construction as cell 1, the cathode of course being maintained at a uniform temperature.

As already stated, variations in the intensity of the spot of light scanning cathode 3, such as caused by nonuniformity of the phosphor of tube 10, cause a spurious signal across resistor 8 and on the grid of tube 9. Because of photocell 19 which receives a portion of the light 8 emitted by the scanning spot, a similar signal appears across resistor 22. This signal is applied through two-stage amplifier 24 and cathode follower 25 to the cathode of tube 9. The phasing of the circuit is such that the spurious signals appearing on the grid and cathode of tube 9 have the same phase. Therefore, if their amplitudes are adjusted to equality, as by movable contact 23, the potential of the grid relative to the cathode is unaffected by the spot intensity variations and these variations will produce no effect on the output of tube 9. Initial adjustment of the circuit is accomplished by darkening cathode 3 with respect to infrared radiation and adjusting contact 23 until the signal on the anode of tube 9 is zero or a minimum.

The direct current component of the desired output signal across resistor 8 is sometimes of interest. Permanent changes in scanning spot intensity, such as caused by ageing of the phosphor in tube 10, can modify this component and thus introduce an error in the output signal. The source of error can also be compensated in the circuit of Fig. 1 by providing direct current amplification between resistor 22 and the cathode of tube 9 as shown in Fig. 1(*a*).

Figure 2 illustrates a method of overcoming the spurious signal in the output of a thermal image converter due to nonuniformity of the scanning tube phosphor which involves holding the scanning spot at constant intensity by means of a negative feedback to the beam intensity control electrode of the scanning tube. As in Fig. 1, 10 is the scanning tube whose electron beam is deflected in linear fashion across the phosphor by means of the deflection system involving elements 13, 14, 15 and 16. A small portion of the light emanating from the scanning spot is focused onto photocell 19' through the use of partially reflecting mirror 20 and lens 21. Cell 19' may be of the type shown in Fig. 1 or of any other suitable type. The voltage developed across resistor 22, which is proportional to the scanning spot intensity, is applied to the grid of amplifier tube 30A which has its plate coupled to the control grid of cathode follower 30B, the cathode of which is connected to the cathode of cathode-ray tube 10. This negative feedback arrangement operates to oppose any tendency for the brightness of the scanning spot to change. For example, if the brightness of the scanning spot should tend to increase, the grid of tube 30A would become more negative relative to its cathode, and the grid and cathode of tube 30B would become more positive relative to ground. As a result the cathode of tube 10 would become more positive relative to ground and therefore more positive relative to the beam intensity control grid 31 which is connected to ground through potentiometer 32. This reduces the beam intensity and opposes the tendency for the scanning spot to increase in brightness. The desired brightness of the scanning spot may be set by potentiometer 32.

I claim:

1. A thermal image converter comprising a thermally sensitive photoemissive cathode the photoemissivity of which is a function of temperature, means for forming in infrared image on said cathode, a cathode-ray tube having a fluorescent screen, means associated with said cathode-ray tube for scanning its beam over said screen to form a scanning spot of light, means for forming an image of said screen on said photoemissive cathode, means for collecting the photoelectrons emitted by said cathode to produce an output signal, said output signal containing a spurious component due to nonuniformities in the fluorescent screen of said cathode-ray tube, an output circuit, means for applying said output signal containing said spurious component to said output circuit, means for producing a compensating signal varying in amplitude in accordance with variations in the brightness of said scanning spot, and means for applying said compensating signal to said output circuit in proper amplitude and phase to cancel said spurious component.

2. A thermal image converter comprising a thermally sensitive photoemissive cathode the photoemissivity of which is a function of temperature, means for forming an infrared image on said cathode, a cathode-ray tube having a fluorescent screen, means associated with said cathode-ray tube for scanning its beam over said screen to form a scanning spot of light, means for forming an image of said screen on said photoemissive cathode, means for collecting the photoelectrons emitted by said cathode to produce an output signal, said output signal containing a spurious component due to nonuniformities in the fluorescent screen of said cathode-ray tube, an output circuit, means for applying said output signal containing said spurious component to said output circuit, means for intercepting a portion of the light emanating from said scanning spot, photoelectric means receiving said intercepted light for generating a signal varying in amplitude in accordance with variations in the brightness of said scanning spot, and means for applying the last named signal to said output circuit in proper amplitude and phase to cancel said spurious component.

3. A thermal image converter comprising a thermally sensitive photoemissive cathode the photoemissivity of which is a function of temperature, means for forming an infrared image on said cathode, a cathode-ray tube having a fluorescent screen, means associated with said cathode-ray tube for scanning its beam over said screen to form a scanning spot of light, means for forming an image of said screen on said photoemissive cathode, means for collecting the photoelectrons emitted by said cathode to produce an output signal, said output signal containing a spurious component due to nonuniformities in the fluorescent screen of said cathode-ray tube, an amplifier stage containing a vacuum tube having an anode, a cathode and a control grid means for applying said output signal containing said spurious component between said control grid and a point of reference potential, means for intercepting a portion of the light emanating from said scanning spot, photoelectric means receiving said intercepted light for generating a signal varying in amplitude in accordance with variations in the brightness of said scanning spot, a circuit containing amplifying means connected between said photoelectric means and the cathode of said vacuum tube for applying said last named signal between said cathode and said point of reference potential in phase with said spurious component on said control grid, and means in said circuit for adjusting the amplitude of the signal at said cathode to equality with the spurious signal at said control grid, and an output circuit connected between the anode of said vacuum tube and said point of reference potential.

References Cited in the file of this patent

UNITED STATES PATENTS

| | | |
|---|---|---|
| 2,241,743 | Schoene | May 13, 1941 |
| 2,353,218 | Burnham | July 11, 1944 |
| 2,796,530 | Phillips et al. | June 18, 1957 |
| 2,804,550 | Artzt | Aug. 27, 1957 |